United States Patent
Cho

(10) Patent No.: US 7,728,757 B2
(45) Date of Patent: Jun. 1, 2010

(54) AUTOFOCUS FOR MINIMUM ENTROPY THROUGH MULTI-DIMENSIONAL OPTIMIZATION

(75) Inventor: Kwang M. Cho, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 12/135,573

(22) Filed: Jun. 9, 2008

(65) Prior Publication Data

US 2009/0303111 A1 Dec. 10, 2009

(51) Int. Cl.
*G01S 13/00* (2006.01)

(52) U.S. Cl. .................. 342/25 A; 342/196; 342/192; 342/25 F

(58) Field of Classification Search .......... 342/25
See application file for complete search history.

(56) References Cited

U.S. PATENT DOCUMENTS

| 4,924,229 | A | 5/1990 | Eichel et al. | |
| 4,999,635 | A | 3/1991 | Niho | |
| 5,248,976 | A | 9/1993 | Niho et al. | |
| 7,145,496 | B2 | 12/2006 | Cho et al. | |
| 2005/0280571 | A1* | 12/2005 | Abatzoglou et al. | 342/25 B |
| 2006/0028370 | A1* | 2/2006 | Hansen et al. | 342/25 A |
| 2006/0109163 | A1* | 5/2006 | Cho et al. | 342/25 R |
| 2007/0238966 | A1* | 10/2007 | Sun et al. | 600/407 |

OTHER PUBLICATIONS

Li Xi Liu Guosui Jinlin Ni, Autofocusing of ISAR images based on entropy minimization, Oct. 1999 vol. 35, Issue: 4, On pp. 1240-1252.*

Eichel et al., "Speckle Processing Method for Synthetic-Aperture-Radar Phase Correction", Optics Letters, vol. 14, No. 1, Jan. 1, 1989, pp. 1-3.

Fienup et al., "Aberration Correction by Maximizing Generalized Sharpness Metrics", J. Opt. Soc. Am. A, vol. 20, No. 4, Apr. 2003, pp. 609-620.

GB Search and Examination Report dated Oct. 8, 2009 for application No. GB0909825.2, pp. 1-6.

* cited by examiner

*Primary Examiner*—Thomas H Tarcza
*Assistant Examiner*—Timothy A Brainard
(74) *Attorney, Agent, or Firm*—Yee & Associates, P.C.; Clifford G. Cousins

(57) ABSTRACT

A computer implemented method, apparatus, and computer usable program code for focusing an image. In one advantageous embodiment, a method is used to focus an image. Optimization is performed to identify an array of coefficients for a polynomial representing a phase correction in a manner that minimizes an entropy value generated by an entropy calculation for the image. The array of coefficients is applied to the polynomial to obtain a desired phase correction. A phase error in the image is corrected using the desired phase correction to focus the image.

24 Claims, 6 Drawing Sheets

AUTOFOCUS FOR MINIMUM ENTROPY THROUGH MULTI-DIMENSIONAL OPTIMIZATION

BACKGROUND INFORMATION

1. Field

The present disclosure relates generally to an improved data processing system and in particular to a method and apparatus for processing image data. Still more particularly, the present disclosure relates to a method, apparatus, and computer usable program code for focusing an image using data generated by a synthetic aperture radar.

2. Background

Synthetic aperture radar (SAR) is a form of radar in which a beam is generated that may be used for applications such as, for example, remote sensing and mapping. In one application, a radar antenna may be attached to an aircraft. A single pulse or signal may be radiated from the antenna that may have different dimensions in the horizontal and vertical direction to achieve desired beam width. Often times, the signal radiated from the antenna may illuminate the terrain below the aircraft outwards towards the horizon. The amplitude and phase of the signal returning from a given location on the ground may be recorded.

Further, the aircraft may transmit a series of pulses as the aircraft travels. The results from these pulses may be combined. In other words, a series of different observations or phases may be combined through different processes to generate an image. This image may be, for example, a map of reflectivity including both amplitude and phase. In these examples, phase information is typically discarded. The amplitude information may contain information about ground cover in the same manner as a black and white picture.

Synthetic aperture radar images may be smeared in the cross range direction due to residual phase error. This smearing is also referred to as being defocused. The cross range direction is also referred to as an azimuth direction. The azimuth direction is perpendicular to the range from the synthetic aperture radar system to the target. This residual phase error may be caused by incomplete motion compensation, atmospheric effects, or some other source.

Autofocus is a function that may be used to produce focused images by estimating and correcting the residual phase error. Phase error may be introduced by navigation errors or other sources that may degrade the quality of the image. In these examples, autofocus may be used during image formation for estimation and compensation of the residual phase error that cannot be completely removed through motion compensation based on navigation data.

Various autofocus algorithms and techniques are currently available. These techniques, however, may be limited in performance or applicable situations. For example, map drift and phase difference methods are examples of parametric approaches that may be used to perform autofocus for processing radar data to create images. These types of methods measure the relative shifts of maps from sub aperture data blocks and use these measurements to estimate non-linear phase error based on piece-wise linear approximations.

Other methods include non-parametric methods, such as, for example, phase gradient algorithm and multiple discrete autofocus. These methods are simple, efficient, and capable of estimating high phase error. The performance of these types of techniques may be affected by the contents in the scene in which the image is made. Other examples of currently available techniques also include successive parameter adjustments, which uses a one dimensional search algorithm to update model parameters to the direction of improving image sharpness metric.

Map drift and phase difference methods are less sensitive to scene contents. These types of methods are limited in the order of phase error that may be estimated. For higher order phase error, full collection array data is divided into small data blocks. This processing leads to a reduction of signal-to-noise ratio. The maximal order that can be estimated is practically limited to around five with this type of technique.

Phase gradient algorithm and multiple discrete autofocus calculate the phase error profile from isolated point targets. However, with these techniques, distinguishing targets closely located in the azimuth from isolated targets cannot be perfect and using non-isolated targets may result in estimation error.

Another situation in which these techniques have difficulty is when the phase error varies spatially. As a result, the chances of having good isolated targets in a small image block are low. This type of situation may result in performance degradation. Further, inaccurate local phase error estimation also poses a problem in achieving phase continuity that is desired between divided small image blocks.

Therefore, it would be advantageous to have a method, apparatus, and computer program product that overcomes the problems described above.

SUMMARY

The advantageous embodiments provide a computer implemented method, apparatus, and computer usable program code for focusing an image. In one advantageous embodiment, a method is used to focus an image. Optimization is performed to identify an array of coefficients for a polynomial representing a phase correction in a manner that minimizes an entropy value generated by an entropy calculation for the image. The array of coefficients is applied to the polynomial to obtain a desired phase correction. A phase error in the image is corrected using the desired phase correction to focus the image.

In another advantageous embodiment, a method is present for focusing an image. A polynomial is formed to express a phase correction. The phase correction is applied to a portion of radar data for the image to form adjusted radar data. An inverse fast Fourier transform is performed on the adjusted radar data to obtain initial image data. An entropy value is identified for an image intensity of the initial image data. An array of coefficients is optimized for the polynomial to reduce the entropy value. In response to obtaining a particular array of coefficients for the polynomial resulting in a desired entropy value, the phase correction is calculated using the polynomial with the particular array of coefficients to form a desired phase correction. The desired phase correction is applied to the radar data to form corrected radar data. The inverse fast Fourier transform is performed on the corrected radar data to form the focused image.

In yet another advantageous embodiment, an apparatus comprises a computer, an objective function located in the computer, and an optimization process located in the computer. The objective function is capable of generating a phase correction with a polynomial representing a phase error, applying the phase correction to radar data, creating an image from the radar data, and calculating an entropy value from the image. The optimization process is capable of generating an array of coefficients for the polynomial that reduces the entropy value.

In still yet another advantageous embodiment, a computer program product contains a program code stored on the computer recordable storage medium. Program code is present for performing optimization to identify an array of coefficients for a polynomial representing a phase correction in a manner that minimizes an entropy value generated by an entropy calculation for the image. Program code is also present for applying the array of coefficients to the polynomial to obtain a desired phase correction. Program code is present for correcting a phase error in the image using the desired phase correction to auto-focus the image.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
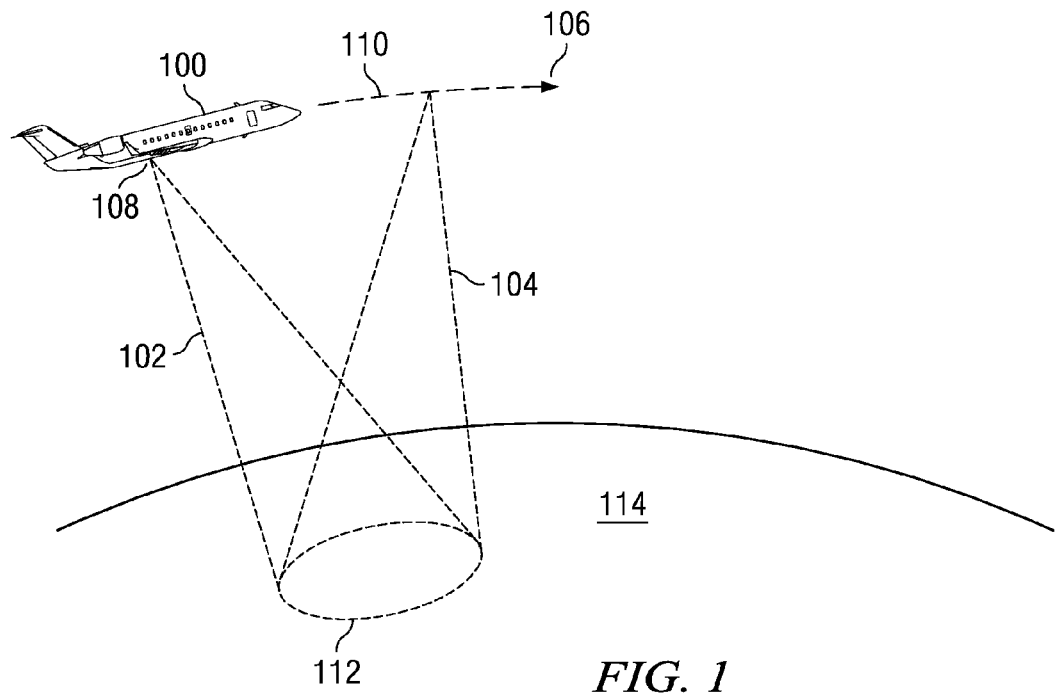
FIG. 1 is a diagram illustrating the collection of data by a synthetic aperture radar system in which an advantageous embodiment may be implemented.

With reference now to the figures and in particular with reference to FIG. 1, a diagram illustrating the collection of data by a synthetic aperture radar system for the case of spotlight mode is depicted in accordance with an advantageous embodiment. In this example, aircraft 100 may include a synthetic aperture radar system, which may generate an array of pulses such as, for example, pulses 102 and 104 while aircraft 100 travels along the direction of dotted line 106. The different dots in dotted line 106 may represent sampling points.

For example, pulse 102 is generated at dot 108, while pulse 104 is generated at dot 110. In these examples, pulses 102 and 104 are radio frequency pulses that illuminate or target section 112 on ground 114. Aircraft 100 receives return or response signals from pulses 102 and 104. These responses form radar data. These responses may be recorded as amplitude and phase to form the radar data. In other words, the radar data may take the form of complex values. This information may be used to generate an image for target section 112.

Figure 2:
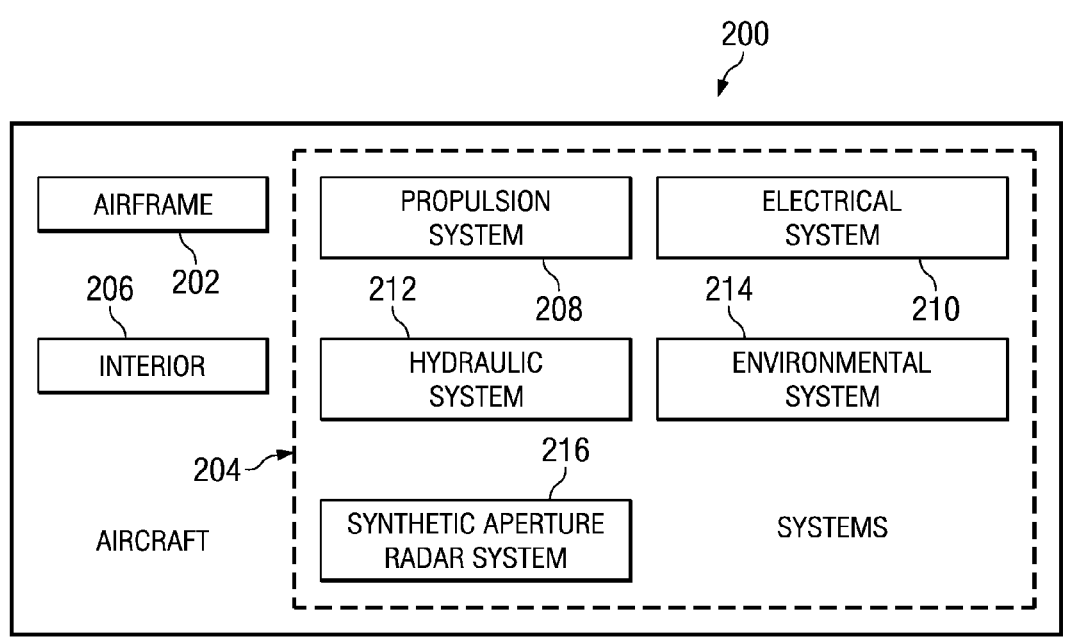
FIG. 2 is a block diagram of an aircraft in accordance with an advantageous embodiment.

With reference now to FIG. 2, a block diagram of an aircraft is depicted in which an advantageous embodiment may be implemented. Aircraft 200 is an example of one implementation for aircraft 100 in FIG. 1. In this example, aircraft 200 may include airframe 202 with a plurality of systems 204 and interior 206. Examples of systems 204 include one or more of propulsion system 208, electrical system 210, hydraulic system 212, environmental system 214, and synthetic aperture radar system 216. Any number of other systems may be included. Synthetic aperture radar system 216 may generate pulses, such as, for example, pulses 102 and 104 in FIG. 1 and collect radar data to generate images for various targets.

The illustration of aircraft 200 in FIG. 2 is provided as an example of one vehicle or structure in which a synthetic aperture radar system may be implemented. Depending on the particular embodiment, synthetic aperture radar system 216 may be located in other types of vehicles. For example, synthetic aperture radar system 216 may be located in a helicopter, an airship, a satellite, a spacecraft, or some other vehicle.

Figure 3:
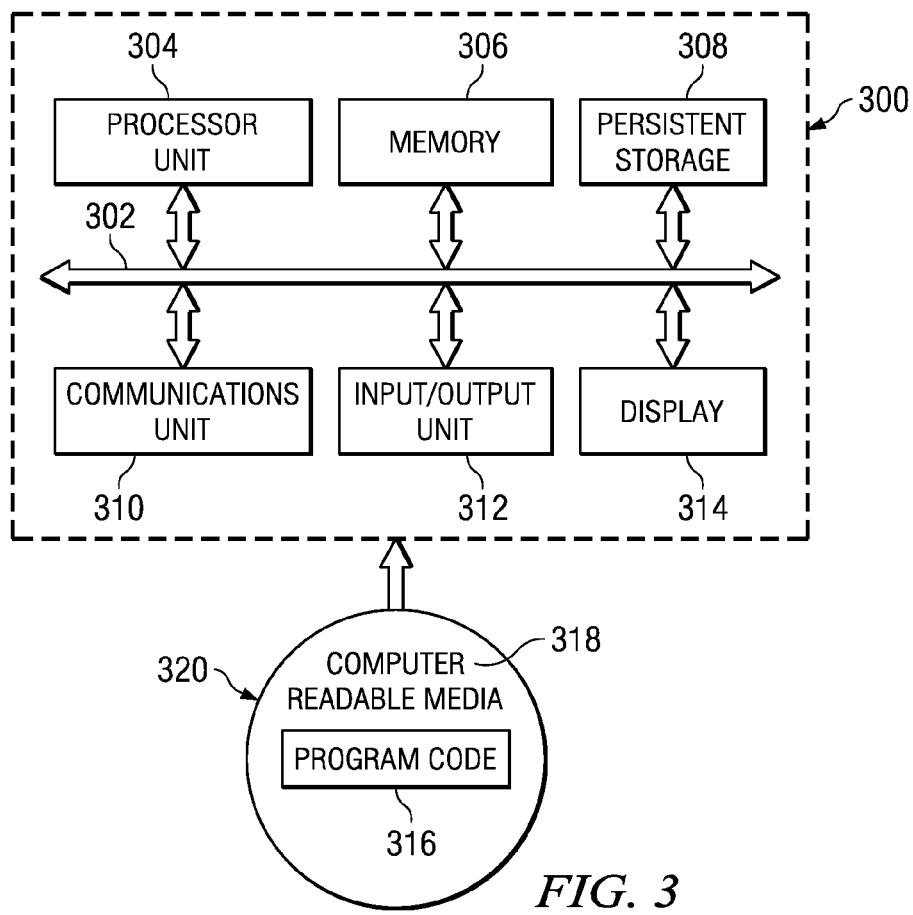
FIG. 3 is a diagram of a data processing system in accordance with an advantageous embodiment.

Turning now to FIG. 3, a diagram of a data processing system is depicted in accordance with an advantageous embodiment. Data processing system 300 is an example of a data processing system that may be located within synthetic aperture radar system 216 in FIG. 2. Data processing system 300 may include processes to autofocus or otherwise process radar data to form images according to different advantageous embodiments.

In some embodiments, data processing system 300 may be in a location remote to aircraft 200 in FIG. 2. In other words, data processing system 300 may be located at a ground location or on some other aircraft or vehicle other than aircraft 200 in which synthetic aperture radar system 216 in FIG. 2 is located.

In this illustrative example, data processing system 300 includes communications fabric 302, which provides communications between processor unit 304, memory 306, persistent storage 308, communications unit 310, input/output (I/O) unit 312, and display 314. Processor unit 304 serves to execute instructions for software that may be loaded into memory 306.

Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis.

Memory 306, in these examples, may be, for example, a random access memory or any other suitable volatile or non-volatile storage device.

Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 306 or a cache such as found in an interface and memory controller hub that may be present in communications fabric 302.

The different advantageous embodiments provide a method, apparatus, and computer usable program code for processing radar data to generate an image. Optimization is performed to identify an array of coefficients for a polynomial representing a phase correction in a manner that minimizes an entropy value generated by an entropy calculation for the image.

An array of coefficients may be an array that contains one or more coefficients in these examples. The array of coefficients is applied to a polynomial to obtain a desire phase correction. The phase correlation in the image is corrected using the desired phase correction to autofocus the image.

Figure 4:
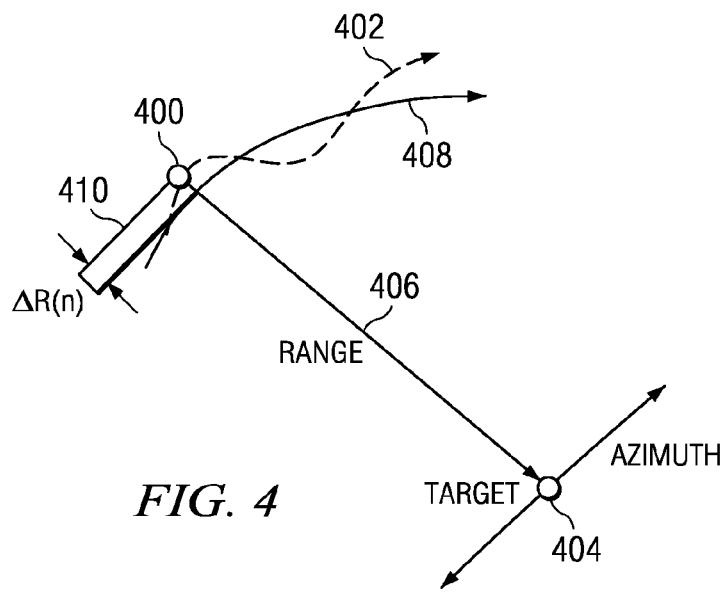
FIG. 4 is a diagram illustrating phase error effects for which corrections may be made in accordance with an advantageous embodiment.

With reference now to FIG. 4, a diagram illustrating phase error effects for which corrections may be made is depicted in accordance with an advantageous embodiment. In this example, synthetic aperture radar system 400 may be implemented using synthetic aperture radar system 216 in FIG. 2.

In this example, synthetic aperture radar system 400 moves along path 402. While moving along path 402, synthetic aperture radar system 400 may send out radio frequency pulses towards a location, such as target 404. The distance from synthetic aperture radar system 400 to target 404 along line 406 is the range.

In these examples, phase error may occur because the actual position of synthetic aperture radar system 400 may differ from the identified position for synthetic aperture radar system 400. In these examples, sensors or other instrumentation may identify synthetic aperture radar system 400 as moving along path 402. In this example, the range between synthetic aperture radar system 400 and target 404 may be different when the actual position of synthetic aperture radar system 400 along path 402 is compared to the identified position for synthetic aperture radar system 400 along path 408.

The difference in this example, as shown in section 410, is shown as $\Delta R(n)$. This difference between the actual position of synthetic aperture radar system 400 and the identified position for synthetic aperture radar system 400 may cause phase error. A phase error may be identified as follows:

$$\Delta \theta(n) = \frac{4\pi}{c} \Delta R(n)$$

where $\Delta \theta(n)$ is phase error for pulse n, $\Delta R(n)$ is the range for a pulse n, n is the pulse index, and c is the speed of light.

This phase error may affect the image by smearing and/or defocusing the image. This phase error also may result in a degraded image contrast. In these examples, the dots in path 402 represent different locations at which radar data may be collected. This radar data is raw radar data in these examples.

Figure 5:
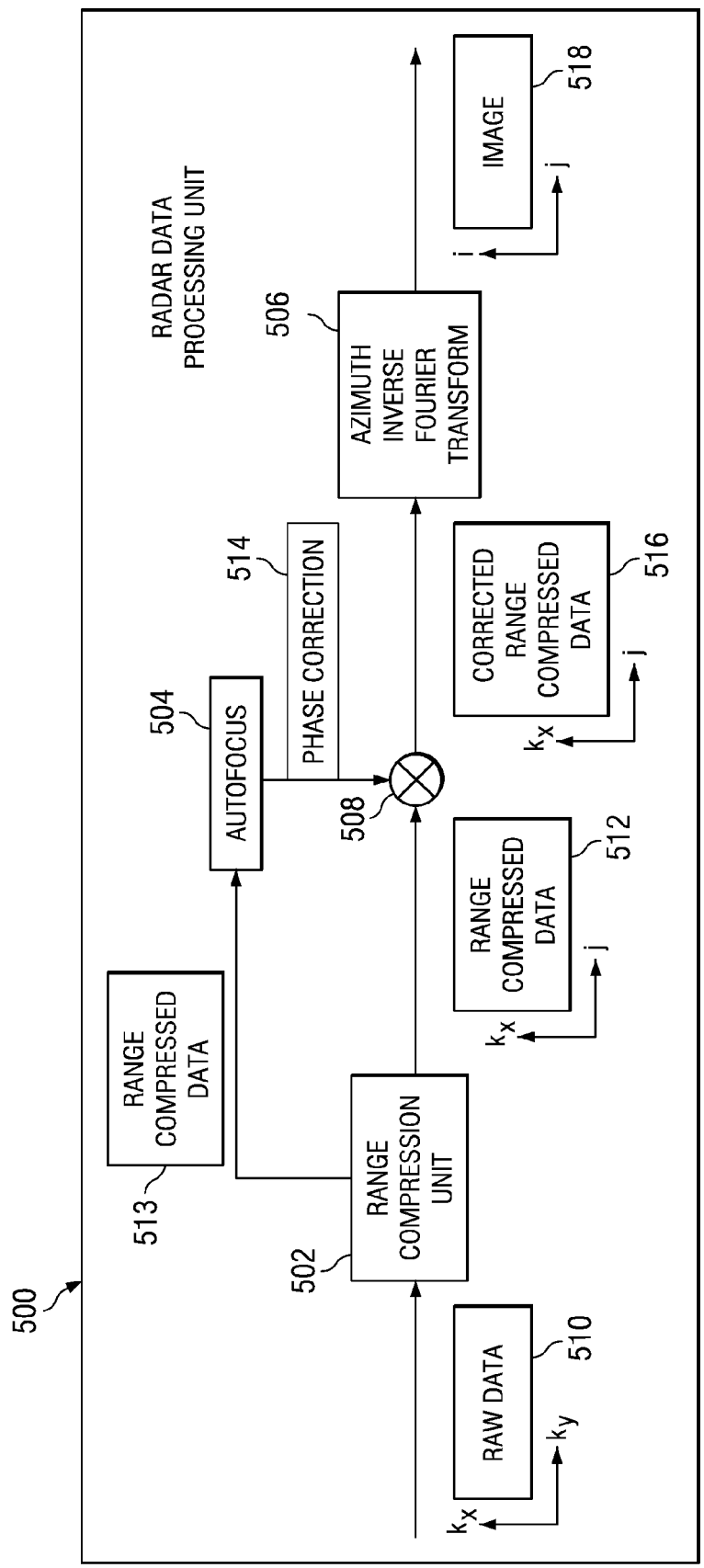
FIG. 5 is a diagram illustrating a radar data processing unit in accordance with an advantageous embodiment.

With reference now to FIG. 5, a diagram illustrating a radar data processing unit is depicted in accordance with an advantageous embodiment. In this example, radar data processing unit 500 is an example of a functional component that may be implemented using a data processing system, such as data processing system 300 in FIG. 3. The different components in FIG. 5 may be implemented in software and/or hardware depending on the particular implementation.

As illustrated, radar data processing unit 500 include range compression unit 502, autofocus 504, fast Fourier transform 506, and phase summing node 508. Range compression unit 502 receives raw data 510. This raw data may be the sampled data generated by a synthetic aperture radar system, such as synthetic aperture radar system 216 in FIG. 2 after analog-to-digital conversion. Raw data 510 may be plotted as $k_x$ versus $k_y$, in which $k_x$ and $k_y$, respectively are the indexed for the pulses and the range samples in each pulse return.

Raw data 510 may be processed by range compression unit 502 to generate range compressed data 512 and range compressed data 513. With a short function title for simplified presentation, range compression unit 502 may perform various functions to form range compressed data 512 and range compressed data 513. These functions include dechirp, motion compensation, interpolation, and range inverse fast Fourier transform processes. The dechirp function removes the quadratic phase in the received chirp signal so that targets at different ranges can be distinguished by frequency.

Dechirp is often performed by an analog device prior to analog-to-digital conversion when the radar bandwidth is large. Motion compensation compensates for phase error induced by platform motion so that reflected signal phase from the reference point on ground is maintained constant.

Interpolation generates data in rectangular grids so that Fourier transform can be performed sequentially in the range and azimuth direction for computational efficiency. Inverse Fourier transform converts data from range spatial frequency to range spatial variable so that received signal energy can be concentrated at each target position in range. Range compressed data 512 and range compressed data 513 are complex data, in these examples, having a magnitude and a phase.

Synthetic aperture radar systems are designed to achieve high resolution in both range and azimuth. To achieve high resolution in range, it is desirable to transmit a very narrow pulse that requires excessively large peak power for acceptable average power. This type of transmission cannot be handled by current radar hardware. For reduced peak power, the radar signal is modulated on a transmission with pulse duration much greater than that required for the desired range solution without modulation. Linear frequency modulation (LFM) is one type of modulation and is widely used in synthetic aperture radar systems. This type of modulation is also referred to as a chirp.

The received signal includes modulated signal returns from many targets on the ground. A synthetic aperture radar image can be obtained by removing the radio frequency (RF) and chirp waveform that is characterized by quadratic phase and taking the Fourier transform to obtain separated images of targets at different ranges.

The Fourier transform is performed to obtain the signal frequency components from time signals of mixed frequencies in typical time-frequency relations. In other words, the time domain signal reflected from targets using a pulse of long duration with chirp waveform is converted to spatial or image domain samples through two main processing functions. These functions are dechirp and inverse Fourier transform. Dechirp is performed to remove the quadratic phase. This process may be performed in the range direction and is called range compression.

Similar phenomenon can be observed in the pulse or equivalently azimuth direction. Thus, the process of obtaining image samples from collected pulses is referred to as azimuth compression. Input for the autofocus function is the data after range inverse fast Fourier transform has been performed for high signal-to-noise ratio. This data is referred to as range compressed data.

Range compressed data 513 is a subset or portion of range compressed data 512. Only a portion of range compressed data 512 needs to be used by autofocus 504 to produce phase correction 514. Of course, in other advantageous embodiments, autofocus 504 may use range compressed data 512 depending on the particular implementation. The manner in which portions of compressed data 512 may be selected for range compressed data 513 may vary.

In these examples, range compressed data 513 is a selection of range bins from range compressed data 512. The range bins are selected as ones being over a particular threshold or a number of range bins having the strongest value. In these examples, the value is the sum of the amplitude square of the azimuth spatial frequency data in each range bin.

Range compressed data 512 may be processed by autofocus 504 to correct any phase error that may be present in compressed data 512. In the different advantageous embodiments, autofocus 504 employs an objective function to model parameters for the phase error causing degradation in image 518 to be produced after azimuth inverse Fourier transform 506.

Once autofocus 504 identifies the phase error, a correction may be made in range compressed data 512 to remove the phase error. The output of autofocus 504 may be phase correction 514 that may be applied to range compressed data 512 using phase summing node 508 to produce corrected range compressed data 516.

Azimuth inverse fast Fourier transform 506 may process corrected range compressed data 516 to generate image 518. In these examples, azimuth inverse fast Fourier transform is performed. Azimuth inverse Fourier transform 506 is an inverse Fourier transform performed in the azimuth direction. A fast Fourier transform is a process to compute a discrete Fourier transform (DFT) and inverse of that transform. This type of transform is used to generate data from radar data. In this example, the inverse fast Fourier transform is performed in the azimuth direction. Image 518 may be defined in terms of azimuth and range.

The illustration of radar data processing unit 500 is presented for purposes of illustrating one manner in which a radar data processing unit may be implemented.

This illustration is not meant to imply architectural or physical limitations to the manner in which different advantageous embodiments may be implemented.

Figure 6:
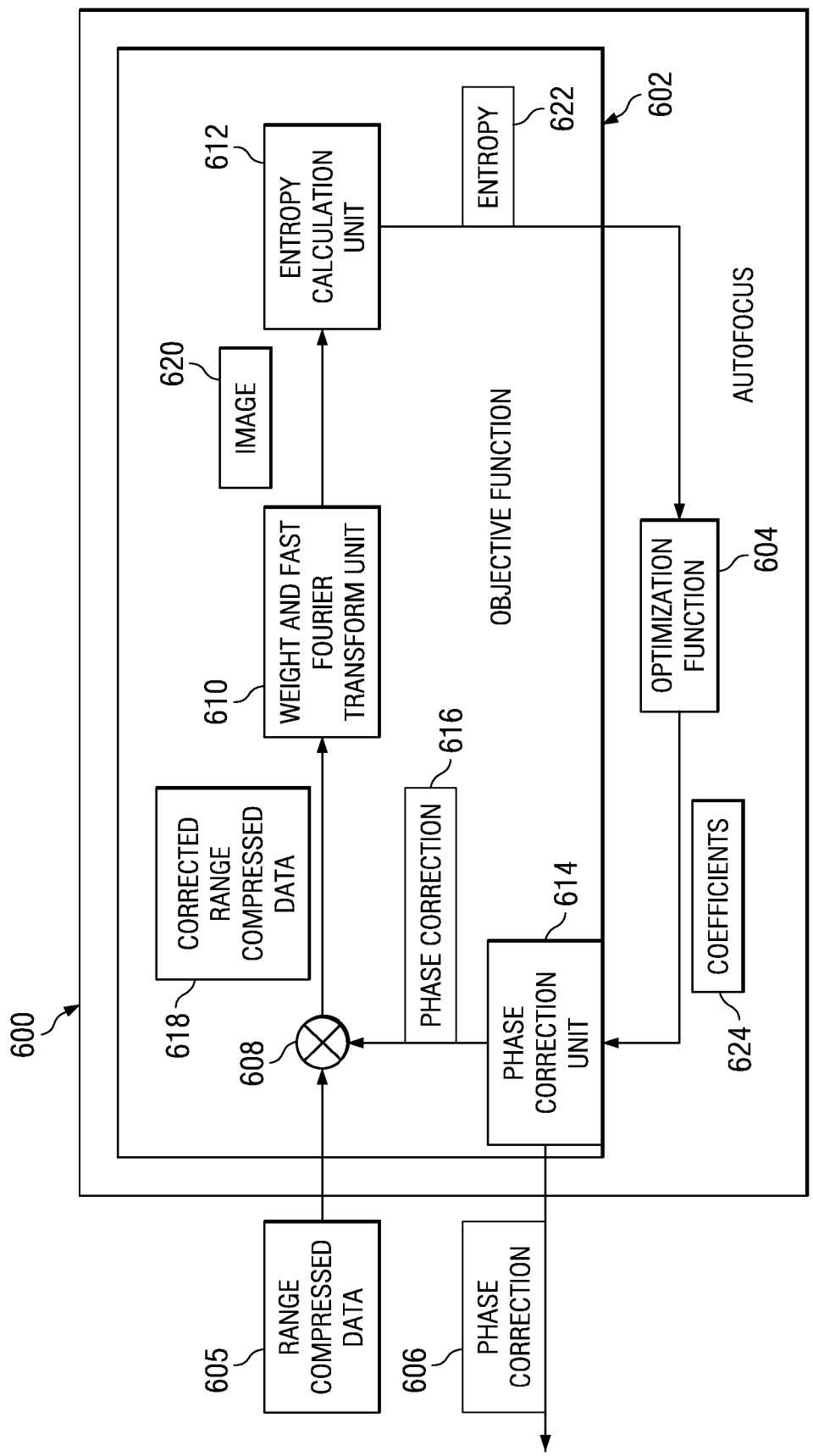
FIG. 6 is a diagram illustrating components in an autofocus in accordance with an advantageous embodiment.

With reference now to FIG. 6, a diagram illustrating components in an autofocus is depicted in accordance with an advantageous embodiment. In this example, autofocus 600 is an example of one implementation of autofocus 504 in FIG. 5.

In this example, autofocus 600 includes objective function 602 and optimization function 604. Objective function 602 receives compressed data 605 and generates phase correction 606 working in conjunction with optimization function 604. In these examples, the range compressed data is similar to range compressed data 513 in FIG. 5, and phase correction 606 is similar to phase correction 514 in FIG. 5.

In this example, objective function 602 includes phase summing node 608, weight and fast Fourier transform unit 610, entropy calculation unit 612, and phase correction unit 614. In these examples, phase correction unit 614 may model the phase error using a polynomial. This polynomial may be in terms of azimuth spatial frequency. In these particular examples, the polynomial is a Legendre polynomial, which is well known to those of one of ordinary skill of the art.

In these examples, range compressed data 605 is a portion of the range compressed data for the image. In these examples, the compressed data has a range identified as $s(k_x, j)$ for a range bin j and azimuth spatial frequency $k_x$. From this range compressed data, a set of range bins is selected to form corrected range compressed data 618 for use in estimating the phase error in the next iteration. A set, as used herein, refers to one or more items. For example, a set of range bins is one or more range bins. In these examples, the set of range bins may be selected as having a power that is greater than some selected threshold number.

Alternatively, a number of range bins having the greatest power may be selected. In these examples, power may be defined as an average or total power in each range bin. Data in this stage is compressed in range but not with respect to azimuth. In these examples, a range column of strong intensity in the spatial domain is selected. This spatial domain may be a domain for the image. The azimuth power in the spatial frequency is the same as the power in the spatial domain.

Each element or each power in a range bin is the magnitude or amplitude squared value at each azimuth spatial frequency. The range bin power is the sum of the power over the different frequencies. For example, these range bins may be selected as follows: $\hat{s}(k_x, \hat{j}) = s(k_x, j)$ if $$\sum_{k_x} |s(k_x, j)|^2 \geq \frac{1}{A} \cdot \max_j \sum_{k_x} |s(k_x, j)|^2$$

where $\hat{s}(k_x, \hat{j})$ is a subset of $s(k_x, j)$ at range bins selected based on range bin power, $s(k_x, j)$ is data after range compression (complex data), $k_x$ is azimuth spatial frequency index, j is range bin index, $\hat{j}$ is reordered index of selected range bins, and A is a selection of range bins with strong intensity for use in phase error estimation. In this example, X and y represent the azimuth and range indexes in the spatial domain.

In these examples, a default value for A may be set at 10 for a 20 dB threshold below the strongest range bin. The number of range bins also may be limited depending on the particular implementation.

Phase correction unit 614 may generate a phase correction, $\Delta\Phi(k_x)$, using $P_n(k_x)$ which is $n^{th}$-order term of a Legendre polynomial as a function of $k_x$. In these examples, the $n_{th}$ term may be generated recursively from lower order terms. The order of the polynomial may be set high enough such that the phase error may be properly represented based on various assumptions about the movement of the synthetic aperture radar system. This polynomial has a set of coefficients which may have a default or initial value. In the different advantageous embodiments, optimization function 604 may be used to optimize the coefficients as described below.

Phase correction unit 614 generates phase correction 616 which may be applied to range compressed data 605 to form corrected range compressed data 618. In these examples, phase correction 616 may be represented as follows:

$$\Delta\Phi(k_x) = \sum_{n=2}^{N} a_n P_n(k_x)$$

where $\Delta\Phi(k_x)$ is the phase correction, $P_n(k_x)$ is $n^{th}$-order term of Legendre polynomial as a function of $k_x$, $k_x$ is the azimuth spatial frequency index, N is order of the Legendre polynomial properly set based on presumed maximum order of the phase error, n is the index, x is the azimuth spatial index, and $a_n$ is the coefficient to be determined to minimize the image entropy using the optimization method.

Applying an optimization technique called Fletcher-Goldforb-Shammo (BFGS) produces final set of these coefficients and focused image can be obtained when the phase is corrected using Legendre polynomial with this final coefficients set. As mentioned above, spatial frequency is the counter part of the spatial variable that is related by a fast Fourier transform. Image is in spatial domain and defocusing in image is mainly due to phase error in spatial frequency domain. Therefore, the different advantageous embodiments estimate and correct the phase error in spatial frequency domain to get the focused image. The illustrative examples defocus in the azimuth direction.

Thereafter, summing unit 608 may apply phase correction 616 to range compressed data 605 to form corrected range compressed data 618 as follows:

$$s'(k_x, \hat{j}) = \hat{s}(k_x, \hat{j}) \cdot \exp[j\Delta\Phi(k_x)]$$

where $s'(k_x, \hat{j})$ is data after phase correction is performed on $\hat{s}(k_x, \hat{j})$ In turn, weight and inverse fast Fourier transform unit 610 may process corrected compressed data 618 to form image 620. In these examples, image 620 may be expressed as:

$$x(i, \hat{j}) = \sum_{k_x} s'(k_x, \hat{j}) \cdot w(k_x) \cdot \exp\left(j2\pi \frac{k_x i}{K}\right)$$

where $w(k_x)$ is weight function applied prior to inverse fast Fourier transform, and K is length of the inverse fast Fourier transform. Weighting may be widely used to reduce sidelobes at the cost of increased mainlobe of target response in spatial domain. In these examples, weighting is applied in spatial frequency domain. Taylor weight is the most commonly used one in synthetic aperture radar system. Weighting is included in these examples for flexibility although performance may not be affected significantly by this term. A weighting case can be considered as applying uniform weights. Weighting functions generally have bell shape, tapering toward edges.

Next, entropy calculation unit 612 processes image 620 to generate an entropy value for the normalized image intensity of image 620. The normalized pixel intensity may be calculated as follows:

$$I(i, \hat{j}) = \frac{|x(i, \hat{j})|^2}{\sum_{i,\hat{j}} |x(i, \hat{j})|^2}$$

where $I(i, \hat{j})$ is normalized pixel intensity (power) at range index $\hat{j}$ and azimuth index i, $x(i, \hat{j})$ is processed subset image (after phase correction in each iteration loop), $\hat{j}$ is the range, and i is the azimuth index.

From normalized image intensity, an entropy value may be calculated as follows:

$$E = -\sum_{i,\hat{j}} I(i, \hat{j}) \cdot \log(I(i, \hat{j}))$$

where E is the entropy of image intensity for image 620 in these examples. This value may be output as entropy 622 to optimization function 604. In these examples, entropy 622 is a target parameter that may be minimized using optimization function 604.

Optimization function 604 may perform an optimization function process to obtain an array of coefficients. In other words, optimization function 604 may generate an array of coefficients that may be output as coefficients 624. These coefficients are then used to generate a new phase correction that is output by phase correction unit 614 as phase correction 616. This phase correction is then applied to compressed data 605 to form corrected range compressed data 618.

Image 620 is generated, and entropy calculation unit 612 calculates entropy 622 which may have a new value based on coefficients 624. This loop may continue with optimization function 604 generating new values for coefficients 624 until a step value for entropy 622 is identified or reached when changes of entropy becomes less than the preset threshold value between iteration loops.

In these examples, the desired value for entropy 622 is a minimum value. In other advantageous embodiments, the desired value may be obtained or identified based on comparing this value with a threshold or some desired effect such as image clarity and/or sharpness.

This array of coefficients may be optimized to produce a minimum value for entropy 622. In these examples, the optimization may be performed using Broyden-Fletcher-Goldfarb-Shammo(BFGS) method. This method may be used to solve the unconstrained non-linear optimization problems such as the one in autofocus 600. Minimization of the entropy value may be performed as follows:

$$[v_{min}, E_{min}] = fminunc(@(v)amemo(v,\hat{s},N),v0)$$

where $v_{min}$ is the array of coefficient variables in which entropy is minimized and $E_{min}$ is the minimum entropy that could be reached when phase error correction is applied using $v_{min}$; fminunc is the efficient unconstraint optimization function using the Broyden-Fletcher-Goldfarb-Shammo method; amemo is the objective function that includes expressions for phase correction, azimuth compression achieved by inverse Fourier transform and entropy calculation in a sequential manner with inputs of v, $\hat{s}$, and N; and v0 is the initial value of v that is set equal to zero. Here, N is the order of the polynomial, v is the array of coefficient variables with the initial value of v0, and $\hat{s}$ is the range compressed data 605 or equivalently the range compressed data 513.

Optimization function 604 outputs coefficients 624 which may be used by phase correction unit 614 to generate phase correction 616. Once entropy 622 has been minimized, objective function 602 may output phase correction 606 for use in focusing the image.

The illustration of autofocus 600 is provided for purposes of showing one manner in which components used to perform autofocus may be implemented. This illustration is not meant to limit the manner in which other advantageous embodiments may be implemented. For example, in some advantageous embodiments, objective function 602 may include a range selection process to select the appropriate portions of data for processing.

Figure 7:
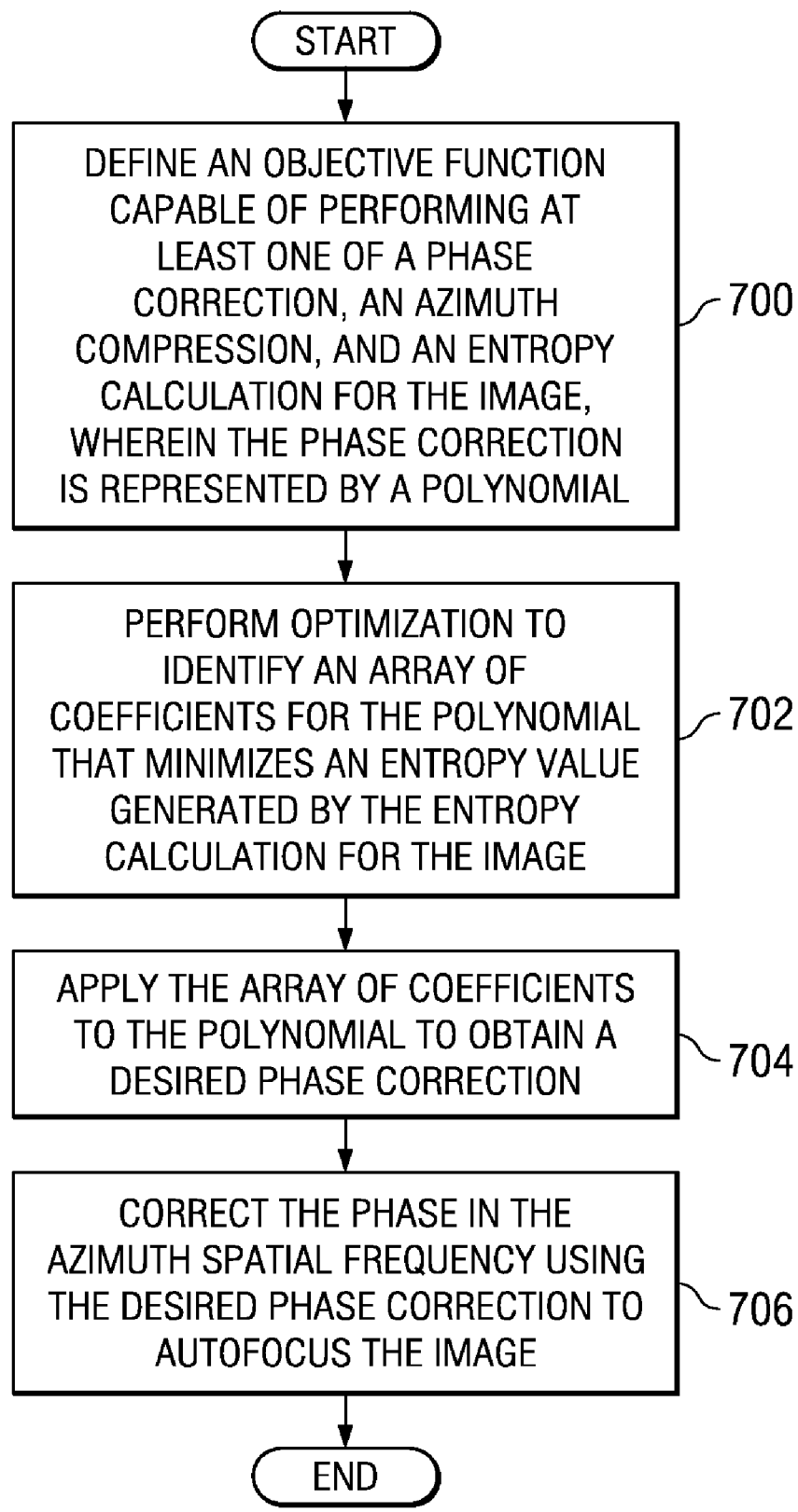
FIG. 7 is a flowchart of a process for auto-focusing an image in accordance with an advantageous embodiment.

With reference now to FIG. 7, a flowchart of a process for auto-focusing an image is depicted in accordance with an advantageous embodiment. The process illustrated in FIG. 7 may be implemented in a radar data processing unit, such as radar data processing unit 500 in FIG. 5.

The process begins by defining an objective function capable of performing at least one of a phase correction, an azimuth compression, and an entropy calculation for the image (operation 700). In this example, the phase correction is represented by polynomial in the manner described above. As used herein, the phrase "at least one of" when used with a list of items means that different combinations one or more of the items may be used, and only one of each item in the list may be needed. For example, "at least one of item A, item B, and item C" may include, for example, without limitation, item A, or item A and item B. This example also may include item A, item B, and item C, or item B and item C.

The process performs optimization to identify an array of coefficients for the polynomial that minimizes an entropy value generated by the entropy calculation for the image (operation 702). In operation 702, the objective function may be used to generate new entropy values for different arrays of coefficients that may be generated during the optimization period. This loop or feedback occurs to iteratively reduce the entropy value until the entropy value reaches some desired value or some number of iterations has occurred. In these examples, the desired value may be the minimum value within a tolerance threshold. The value selected may be one that reaches the minimum within a threshold or is more than the threshold away from the minimum depending on the particular implementation.

The process applies the array of coefficients to the polynomial to obtain the desired phase correction (operation 704). The process then corrects the phase shift in the image using the desired phase correction to autofocus the image (operation 706), with the process terminating thereafter. The correction of the image in operation 706 is performed by correcting the phase shift in the azimuth spatial frequency. In this manner an image with a better focus than before may be generated.

Figure 8:
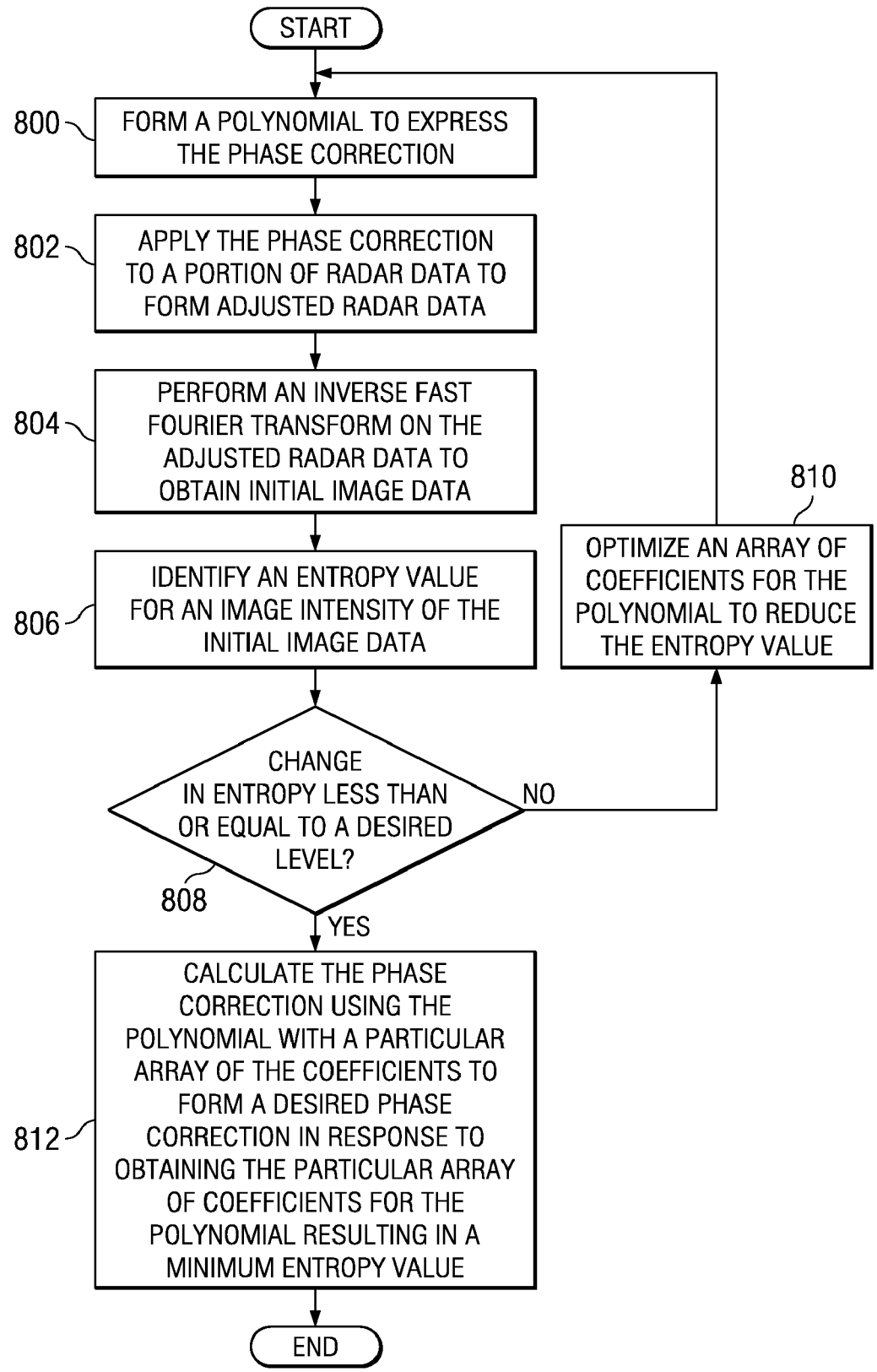
FIG. 8 is a flowchart of a process for generating a phase correction in accordance with an advantageous embodiment.

With reference now to FIG. 8, a flowchart of a process for generating a phase correction is depicted in accordance with an advantageous embodiment. The process illustrated in FIG. 8 may be implemented in an autofocus component, such as autofocus 504 in FIG. 5.

The process begins by forming a polynomial to express the phase correction (operation 800). In operation 800, the polynomial is formed by selecting coefficients for the polynomial. These coefficients may be from an array received by the process. Initially, these coefficients may have some initial default value. At a later point in time, the polynomial may be formed from new coefficients generated by later operations.

The phase correction is applied to a portion of radar data to form adjusted radar data (operation 802). The radar data, in these examples, is range compressed radar data in which the data is expressed in terms of magnitude and phase.

The process performs an inverse fast Fourier transform on the adjusted radar data in azimuth spatial frequency to obtain initial image data (operation 804). This initial image data is created using only a portion of the radar data in these examples. For example, this portion of the data may be a selected number of range bins within the total number of range bins for the image.

In this manner, a reduction in processing resources may occur. The portion of the radar data is selected such that an evaluation of the entropy levels can be made. In these examples, a set of range bins for the radar data is selected. An entropy value for an image intensity of the initial image data is identified (operation 806).

A determination is made as to whether the entropy change from the previous iteration step is less than or equal to a desired level (operation 808). If the entropy change is greater than a desired level, the process optimizes an array of coefficients for the polynomial to reduce the entropy value (operation 810), with the process returning to operation 800 as described above.

With reference again to operation 808, if the entropy change is less than or equal to a desired level, no further optimization is needed. The process then calculates the phase correction using the polynomial with the particular array of coefficients to form a desired phase correction in response to obtaining the particular array of coefficients for the polynomial resulting in the desired entropy value (operation 812), with the process terminating thereafter.

In this manner, the process in FIG. 8 may iteratively apply coefficients to the polynomial, apply phase correction to the radar data, generate an image from the adjusted radar data, and identify an entropy value with the new array of coefficients until a minimum entropy value is reached within a specified threshold. In this depicted example, the desired entropy value is a minimum entropy value.

Depending on the optimal process used, other embodiments may set a threshold or value for the entropy to form the desired entropy value. In other words, optimization may cease if an entropy value or change in the entropy value reaches or is less than a selected value.

Thus, the different advantageous embodiments provide a method, apparatus, and computer usable program code for processing image data. In these examples, the image data is radar data that may be obtained from a synthetic aperture radar system. Optimization is performed to identify an array of coefficients for a polynomial representing a phase correction in a manner that minimizes entropy value generated by an entropy calculation for the image. The array of coefficients is applied to the polynomial to obtain a desired phase correction. The image is corrected using the desired phase correction to autofocus the image in these examples.

Thus, the different advantageous embodiments provide an ability to reduce phase error in images that may be applicable for any type of scene. The different advantageous embodiments provide a parametric approach that may use multi-dimensional optimization for an objective function to generate a phase correction to reduce smearing or other undesirable artifacts from a phase error generated in the creation of radar data. The different advantageous embodiments may be used to post process the radar data.

In other advantageous embodiments, these different processes may be used in real time as radar data is collected. In this manner, the different advantageous embodiments may be used to produce focused high resolution images from data collected from synthetic aperture radar systems.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for focusing an image, the method comprising:
defining an objective function configured to perform an entropy calculation;
performing optimization to identify an array of coefficients for a polynomial representing a phase correction in a manner that minimizes an entropy value generated by an entropy calculation for the image, wherein the objective function generates a new entropy value for the array of coefficients during an optimization period and iteratively reduces the entropy value until a threshold is reached;
responsive to reaching the threshold, applying the array of coefficients to the polynomial to obtain a desired phase correction; and
correcting a phase error in the image using the desired phase correction to focus the image.

2. The method of claim 1, wherein the performing step comprises:
generating values for the array of coefficients using an objective function capable of performing the phase correction and the entropy calculation for the image with the phase correction applied to the image;
using the objective function to generate a new entropy value with the values for the array of coefficients; and
repeatedly performing the generating step and using step with changes to the values in a manner that reduces the new entropy value until a desired entropy value is obtained that results in the desired phase correction.

3. The method of claim 2, wherein using step comprises:
generating the phase correction on radar data for the image using the values to generate corrected radar data;
forming the image from the corrected radar data; and
performing the entropy calculation with the image to form the new entropy value.

4. The method of claim 3, wherein the radar data comprises complex data and wherein the forming step comprises:
applying the phase correction to complex data for the image to form the corrected radar data in a form of corrected complex data; and
performing an inverse fast Fourier transform on the corrected complex data to form the image.

5. The method of claim 3, wherein the forming step comprises:
performing an inverse fast Fourier transform on the corrected radar data to form the image.

6. The method of claim 3, wherein the radar data is a portion of all of the radar data for the image.

7. The method of claim 6, wherein the radar data is partitioned into a plurality of range bins and the portion of the radar data comprises a set of range bins within the plurality of range bins.

8. The method of claim 3 further comprising:
generating the radar data using a synthetic aperture system.

9. The method of claim 1, wherein the optimization uses a Broyden-Fletcher-Goldfarb-Shanno method.

10. The method of claim 1, wherein the polynomial is a Legendre polynomial.

11. The method of claim 1, wherein the image comprises data collected from a synthetic aperture radar system on an aircraft.

12. A. method for focusing an image, the method comprising:
forming a polynomial to express a phase correction;
applying the phase correction to a portion of radar data for the image to form adjusted radar data;
performing an inverse fast Fourier transform on the adjusted radar data to obtain initial image data;
identifying an entropy value for an image intensity of the initial image data;
optimizing an array of coefficients for the polynomial to reduce the entropy value, wherein an objective function generates a new entropy value for the array of coefficients during an optimization period and iteratively reduces the entropy value until a threshold is reached;
responsive to obtaining a particular array of coefficients for the polynomial in accordance with the objective function that results in a desired entropy value, calculating the phase correction using the polynomial with the particular array of coefficients to form a desired phase correction;
applying the desired phase correction to the radar data to form corrected radar data; and
performing the inverse fast Fourier transform on the corrected radar data to form the focused image.

13. The method of claim 12, wherein the radar data comprises complex data in which each piece of the radar data has a magnitude and a phase.

14. The method of claim 12, wherein the polynomial is a Legendre polynomial.

15. The method of claim 14, wherein the phase correction is identified as follows:

$$\Delta\Phi(k_x) = \sum_{n=2}^{N} a_n P_n(k_x)$$

where $\Delta\Phi(k_x)$ is the phase correction, $P_n(k_x)$ is $n^{th}$-order term of Legendre polynomial as a function of $k_x$, $k_x$ is the azimuth spatial frequency index, N is an order of a Legendre polynomial, n is an index, x is an azimuth spatial index, and an is a coefficient to be determined to minimize the image entropy using the optimization method.

16. The method of claim 12, wherein the optimizing step comprises:
optimizing the array of coefficients for the polynomial using a Broyden-Fletcher-Goldfarb-Shanno method to reduce the entropy value.

17. The method of claim 12 further comprising:
selecting a set of range bins from a plurality of range bins containing complex data formed from responses to signals generated by a synthetic aperture radar system to form a portion of the radar data.

18. The method of claim 17, wherein each range bin in the plurality of range bins contains data for a selected range and a selected azimuth spatial frequency.

19. The method claim 17, wherein the set of range bins is selected as having a power greater than a selected threshold.

20. An apparatus comprising:
a computer;
an objective function located in the computer, wherein the objective function is capable of generating a phase correction with a polynomial representing a phase error, applying the phase correction to radar data, creating an image from the radar data, and calculating an entropy value from the image, wherein the objective function generates a new entropy value for the array of coefficients during an optimization period and iteratively reduces the entropy value until a threshold is reached; and an optimization process located in the computer, wherein the optimization process is configured to generate an array of coefficients for the polynomial that reduces the entropy value in accordance with the objective function.

21. The apparatus of claim 20 further comprising:

a synthetic aperture radar system capable of generating the radar data.

22. The apparatus of claim 20 further comprising:

an aircraft, wherein the synthetic aperture radar system is located on the aircraft.

23. The apparatus of claim 22, wherein the synthetic aperture radar system is located in at least one of the aircraft and a ground location.

24. A computer program product comprising:

a computer usable medium having computer usable program code for focusing an image, the computer program product comprising:

a computer recordable storage medium;

program code, stored on the computer recordable storage medium, for defining an objective function configured to perform an entropy calculation;

program code, stored on the computer recordable storage medium, for performing optimization to identify an array of coefficients for a polynomial representing a phase correction in a manner that minimizes an entropy value generated by an entropy calculation for the image, wherein the objective function generates a new entropy value for the array of coefficients during an optimization period and iteratively reduces the entropy value until a threshold is reached;

program code, stored on the computer recordable storage medium, for applying the array of coefficients to the polynomial to obtain a desired phase correction; and program code, stored on the computer recordable storage medium, for correcting a phase error in the image using the desired phase correction to auto-focus the image.

* * * * *